US012062318B2

(12) United States Patent
Meng et al.

(10) Patent No.: US 12,062,318 B2
(45) Date of Patent: Aug. 13, 2024

(54) METHOD FOR DRIVING DISPLAY PANEL, TIMING CONTROLLER, DISPLAY APPARATUS AND METHOD OF CALIBRATING A DISPLAY APPARATUS

(71) Applicants: Hefei BOE Joint Technology Co., Ltd., Hefei (CN); BOE Technology Group Co., Ltd., Beijing (CN)

(72) Inventors: Song Meng, Beijing (CN); Jingbo Xu, Beijing (CN); Pan Li, Beijing (CN)

(73) Assignees: Hefei BOE Joint Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/766,696

(22) PCT Filed: Jun. 29, 2021

(86) PCT No.: PCT/CN2021/103271
§ 371 (c)(1),
(2) Date: Apr. 5, 2022

(87) PCT Pub. No.: WO2023/272525
PCT Pub. Date: Jan. 5, 2023

(65) Prior Publication Data

US 2024/0071284 A1 Feb. 29, 2024

(51) Int. Cl.
*G09G 3/20* (2006.01)
*G09G 3/3233* (2016.01)

(52) U.S. Cl.
CPC ......... *G09G 3/2096* (2013.01); *G09G 3/2074* (2013.01); *G09G 3/3233* (2013.01);
(Continued)

(58) Field of Classification Search
CPC .. G09G 3/2074; G09G 3/2096; G09G 3/3233; G09G 2300/0842; G09G 2320/0233; G09G 2360/16
See application file for complete search history.

(56) References Cited

U.S. PATENT DOCUMENTS 10,109,245 B2 * 10/2018 Zeng .................... G09G 3/3607
2015/0194119 A1 7/2015 Ahn et al.
(Continued)

FOREIGN PATENT DOCUMENTS

CN 102568430 A 7/2012
CN 106023939 A 10/2016
(Continued)

OTHER PUBLICATIONS

Machine translation of CN 102568430 (Year: 2024).*
(Continued)

*Primary Examiner* — Michael Pervan
(74) *Attorney, Agent, or Firm* — Intellectual Valley Law, P.C.

(57) ABSTRACT

A method for driving a display panel is provided. The method includes receiving image data of a frame of image, the image data including a plurality of initial grayscale values respectively for a plurality of subpixels in the display panel; and converting the image data into a converted image data including a plurality of converted grayscale values respectively for the plurality of subpixels. Converting the image data includes compensating a respective initial grayscale value for a respective subpixel by at least a respective delay-compensating factor to obtain a respective converted grayscale value. With respect to a p-th subpixel and a q-th subpixel respectively connected to a respective data line and having a same initial grayscale values, a p-th delay-com-
(Continued)

pensating factor for the p-th subpixel is greater than a q-th delay-compensating factor for the q-th subpixel.

14 Claims, 8 Drawing Sheets

(52) U.S. Cl.
CPC ............... *G09G 2300/0842* (2013.01); *G09G 2320/0233* (2013.01); *G09G 2360/16* (2013.01)

(56) References Cited

U.S. PATENT DOCUMENTS

| | | | | |
|---|---|---|---|---|
| 2018/0182321 | A1* | 6/2018 | Zeng .................... | G09G 3/3607 |
| 2018/0268753 | A1 | 9/2018 | Wang et al. | |
| 2020/0227006 | A1 | 7/2020 | Yao et al. | |

FOREIGN PATENT DOCUMENTS

| | | | |
|---|---|---|---|
| CN | 106652966 | A | 5/2017 |
| CN | 109285498 | A | 1/2019 |
| CN | 109658900 | A | 4/2019 |
| CN | 109903716 | A | 6/2019 |
| CN | 111161691 | A | 5/2020 |

OTHER PUBLICATIONS

Machine translation of CN 109903716 (Year: 2024).*
Machine translation of CN 109658900 (Year: 2024).*
International Search Report & Written Opinion mailed Mar. 28, 2022, regarding PCT/CN2021/103271.

* cited by examiner

METHOD FOR DRIVING DISPLAY PANEL, TIMING CONTROLLER, DISPLAY APPARATUS AND METHOD OF CALIBRATING A DISPLAY APPARATUS

CROSS-REFERENCE TO RELATED APPLICATION

This application is a national stage application under 35 U.S.C. § 371 of International Application No. PCT/CN2021/103271, filed Jun. 29, 2021, the contents of which are incorporated by reference in the entirety.

TECHNICAL FIELD

The present invention relates to display technology, more particularly, to a method for driving a display panel, a timing controller, a display apparatus and a method of calibrating a display apparatus.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In a first aspect, the present disclosure provides a method for driving a display panel comprising: receiving image data of a frame of image, the image data comprising a plurality of initial grayscale values respectively for a plurality of subpixels in the display panel; and converting the image data into a converted image data comprising a plurality of converted grayscale values respectively for the plurality of subpixels; wherein converting the image data comprises compensating a respective initial grayscale value for a respective subpixel by at least a respective delay-compensating factor to obtain a respective converted grayscale value; wherein, with respect to a p-th subpixel and a q-th subpixel respectively connected to a respective data line and having a same initial grayscale values, a p-th delay-compensating factor for the p-th subpixel is greater than a q-th delay-compensating factor for the q-th subpixel such that a p-th converted grayscale value for the p-th subpixel is greater than a q-th converted grayscale value for the q-th subpixel; and along an extension direction of the respective data line, the respective data line is first connected to a data integrated circuit, then to the q-th subpixel, and lastly to the p-th subpixel.

In some embodiments of the present disclosure, the respective data line is sequentially connected to the data integrated circuit, and then N number of subpixels respectively in N number of rows; the p-th subpixel is in a p-th row, $1<p\leq N$; the q-th subpixel is in a q-th row, $1\leq q<N$; and the q-th row is between the data integrated circuit and the p-th row.

In some embodiments of the present disclosure, converting the image data comprises determining the respective converted grayscale value by a look-up table stored in a memory; and wherein the look-up table comprises a plurality of pre-stored converted grayscale values respectively corresponding to different initial grayscale values for the respective subpixel.

In some embodiments of the present disclosure, converting the image data comprises calculating the respective converted grayscale value by a conversion algorithm.

In some embodiments of the present disclosure, the conversion algorithm is expressed as Grc=Gri*Gain (R); wherein Grc stands for the respective converted grayscale value, Gri stands for the respective initial grayscale value, and Gain (R) stands for a factor correlated to a sequence number of a respective row in which the respective subpixel is located.

In some embodiments of the present disclosure, the conversion algorithm is expressed as Grc=(a*Gri)+b; wherein Grc stands for the respective converted grayscale value, Gri stands for the respective initial grayscale value, a and b stand for parameters specific to the respective subpixel.

In some embodiments of the present disclosure, the method further comprises establishing a conversion algorithm for converting the image data or constructing a look-up table for converting the image data.

In some embodiments of the present disclosure, establishing the conversion algorithm or constructing the look-up table comprises: providing a first reference data signal to a reference subpixel without conversion, the first reference data signal comprising the respective initial grayscale value; measuring a first brightness value of a first subpixel image displayed by the reference subpixel; providing a second reference data signal to a candidate subpixel without conversion, the first reference data signal and the second reference data signal having a same voltage level; adjusting a grayscale value of the second reference data signal provided to the candidate subpixel until a second brightness value of a second subpixel image displayed by the candidate subpixel is substantially the same as the first brightness value; and obtaining a grayscale value of the second reference data signal corresponding to the second brightness value.

In some embodiments of the present disclosure, establishing the conversion algorithm further comprises calculating a Gain (R) factor for the candidate subpixel by dividing the grayscale value of the second reference data signal by the respective initial grayscale value.

In some embodiments of the present disclosure, establishing the conversion algorithm or constructing the look-up table comprises: measuring brightness values respectively of a plurality of reference subpixel images respectively displayed by one or more reference subpixels in a reference row and a plurality of candidate subpixel images respectively displayed by one or more candidate subpixels in a candidate row; and obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value.

In some embodiments of the present disclosure, the plurality of reference subpixel images and the plurality of candidate subpixel images are subpixel images from a same frame of image displayed by the display panel.

In some embodiments of the present disclosure, the plurality of reference subpixel images are respectively displayed by a plurality of reference subpixels in the reference row and respectively in a plurality of columns; or the plurality of candidate subpixel images are respectively displayed by a plurality of candidate subpixels in the candidate row and respectively in a plurality of columns.

In some embodiments of the present disclosure, the plurality of reference subpixel images and the plurality of candidate subpixel images are subpixel images from at least two frames of image displayed by the display panel.

In some embodiments of the present disclosure, establishing the conversion algorithm further comprises fitting a conversion curve for a respective one of the one or more candidate subpixels using the plurality of reference grayscale values in the reference set and the plurality of candidate grayscale values in the candidate set.

In some embodiments of the present disclosure, converting the image data comprises compensating the respective initial grayscale value for the respective subpixel by at least the respective delay-compensating factor and a respective secondary compensating factor to obtain the respective converted grayscale value; and the respective secondary compensating factor is correlated to a difference between the respective initial grayscale value and an initial grayscale value of an immediately adjacent subpixel, the immediately adjacent subpixel and the respective subpixel being connected to a same data line, and data signals are respectively provided first to the immediately adjacent subpixel and then to the respective subpixel sequentially and consecutively.

In a second aspect, the present disclosure provides a timing controller configured to: receive image data of a frame of image, the image data comprising a plurality of initial grayscale values respectively for a plurality of subpixels in a display panel; and convert the image data into a converted image data comprising a plurality of converted grayscale values respectively for the plurality of subpixels; wherein the timing controller is configured to compensate a respective initial grayscale value for a respective subpixel by at least a respective delay-compensating factor to obtain a respective converted grayscale value; wherein, with respect to a p-th subpixel and a q-th subpixel respectively connected to a respective data line and having a same initial grayscale values, a p-th delay-compensating factor for the p-th subpixel is greater than a q-th delay-compensating factor for the q-th subpixel such that a p-th converted grayscale value for the p-th subpixel is greater than a q-th converted grayscale value for the q-th subpixel; and along an extension direction of the respective data line, the respective data line is first connected to a data integrated circuit, then to q-th subpixel, and lastly to the p-th subpixel.

In some embodiments of the present disclosure, the timing controller is further configured to compensate the respective initial grayscale value for the respective subpixel by at least the respective delay-compensating factor and a respective secondary compensating factor to obtain the respective converted grayscale value; wherein the respective secondary compensating factor is correlated to a difference between the respective initial grayscale value and an initial grayscale value of an immediately adjacent subpixel, the immediately adjacent subpixel and the respective subpixel being connected to a same data line, and data signals are respectively provided first to the immediately adjacent subpixel and then to the respective subpixel sequentially and consecutively.

In a third aspect, the present disclosure provides a display apparatus, comprising the timing controller of the second aspect, a display panel, and a plurality of data integrated circuits, a respective data integrated circuit is coupled to the timing controller and coupled to the display panel.

In a fourth aspect, the present disclosure provides a method of calibrating a display apparatus, comprising: establishing a conversion algorithm or constructing a look-up table; receiving image data of a frame of image, the image data comprising a plurality of initial grayscale values respectively for a plurality of subpixels in a display panel; and converting the image data into a converted image data comprising a plurality of converted grayscale values respectively for the plurality of subpixels, using the conversion algorithm or the look-up table.

In some embodiments of the present disclosure, establishing the conversion algorithm or constructing the look-up table comprises: providing a first reference data signal to a reference subpixel without conversion, the first reference data signal comprising a respective initial grayscale value; measuring a first brightness value of a first subpixel image displayed by the reference subpixel; providing a second reference data signal to a candidate subpixel without conversion, the first reference data signal and the second reference data signal having a same voltage level; adjusting a grayscale value of the second reference data signal provided to the candidate subpixel until a second brightness value of a second subpixel image displayed by the candidate subpixel is substantially the same as the first brightness value; and obtaining a grayscale value of the second reference data signal corresponding to the second brightness value.

In some embodiments of the present disclosure, the look-up table comprises correspondence between the grayscale value of the second reference data signal and the respective initial grayscale value.

In some embodiments of the present disclosure, establishing the conversion algorithm further comprises calculating a Gain (R) factor for the candidate subpixel by dividing the grayscale value of the second reference data signal by the respective initial grayscale value.

In some embodiments of the present disclosure, establishing the conversion algorithm or constructing the look-up table comprises: measuring brightness values respectively of a plurality of reference subpixel images respectively displayed by one or more reference subpixels in a reference row and a plurality of candidate subpixel images respectively displayed by one or more candidate subpixels in a candidate row; and obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value.

In some embodiments of the present disclosure, the look-up table comprises correspondence respectively between the plurality of reference grayscale values in the reference set for a respective subpixel, and the plurality of candidate grayscale values in the candidate set for the respective subpixel.

In some embodiments of the present disclosure, establishing the conversion algorithm further comprises fitting a conversion curve for a respective one of the one or more candidate subpixels using the plurality of reference grayscale values in the reference set and the plurality of candidate grayscale values in the candidate set.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
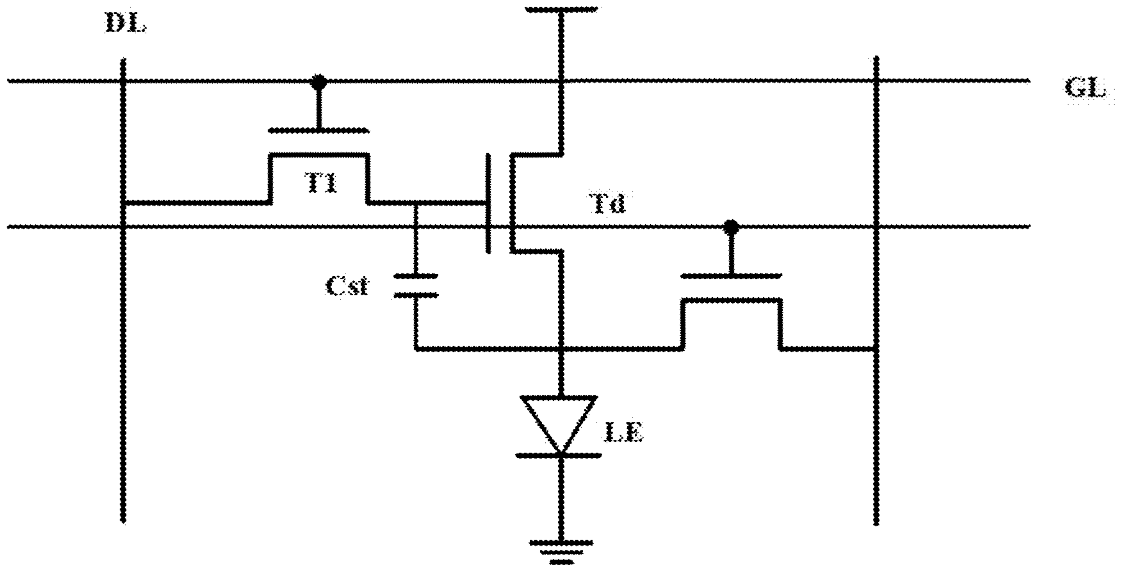
FIG. 1 is a circuit diagram illustrating the structure of a pixel driving circuit in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a method for driving a display panel, a timing controller, and a display apparatus that substantially obviate one or more of the problems due to limitations and disadvantages of the related art. In one aspect, the present disclosure provides a method for driving a display panel. In some embodiments, the method includes receiving image data of a frame of image, the image data comprising a plurality of initial grayscale values respectively for a plurality of subpixels in the display panel; and converting the image data into a converted image data comprising a plurality of converted grayscale values respectively for the plurality of subpixels. In some embodiments, converting the image data includes compensating a respective initial grayscale value for a respective subpixel by at least a respective delay-compensating factor to obtain a respective converted grayscale value. Optionally, with respect to a p-th subpixel and a q-th subpixel respectively connected to a respective data line and having a same initial grayscale values, a p-th delay-compensating factor for the p-th subpixel is greater than a q-th delay-compensating factor for the q-th subpixel such that a p-th converted grayscale value for the p-th subpixel is greater than a q-th converted grayscale value for the q-th subpixel. Optionally, along an extension direction of the respective data line, the respective data line is first connected to a data integrated circuit, then to the q-th subpixel, and lastly to the p-th subpixel.

In some embodiments, the respective data line is sequentially connected to the data integrated circuit, and then N number of subpixels respectively in N number of rows. Optionally, the p-th subpixel is in a p-th row, $1<p\leq N$. Optionally, the q-th subpixel is in a q-th row, $1\leq q<N$. Optionally, the q-th row is between the data integrated circuit and the p-th row.

Display technology has been continuously advanced to develop display panels with a larger size, a higher resolution, and a higher refresh rate, placing higher demands on fabrication technique and pixel driving technology. For example, a display panel with an increased size necessarily has a data line with an increased length, which inevitably results in a higher resistance and a higher capacitance, and in turn increased RC delay. Moreover, a higher resolution typically requires a narrower line width for the data line, accompanied by an increased resistance in the data line. Further, an increase in resolution and/or refresh rate will result in a charging time allocated for each row of subpixels being reduced. To illustrate, a display panel with a 4K resolution and a refresh rate of 60 Hz would have a charging time of 7.4 μs allocated for each row of subpixels, while a display panel with an 8K resolution and a refresh rate of 120 Hz would have a charging time of mere 1.85 μs allocated for each row of subpixels.

These issues present challenges to maintaining image display qualities in a display panel. The increase in RC delay and/or the decrease in charging time will result in insufficient charging rate of a storage capacitor of a pixel driving circuit. As a result, the pixel driving circuit cannot be charged by the data signal to the ideal voltage value. In one example, the display panel is configured to display a monochromatic image of a uniform grayscale for all subpixels, a brightness value will gradually decrease along an extension direction of the data line as the data line extends away from a data integrated circuit. In another example, the display panel is configured to display a full color image, the changing correspondence between brightness and grayscale values along the extension direction of the data line will result in a deteriorated display quality.

FIG. 1 is a circuit diagram illustrating the structure of a pixel driving circuit in some embodiments according to the present disclosure. FIG. 1 shows an example in which the pixel driving circuit is a 3T1C circuit. Referring to FIG. 1, in a data write sub-phase of an image display phase, a first transistor T1 is turned on by a gate line GL, and a data signal transmitted through the data line DL is received by a source electrode of the first transistor T1, and in turn transmitted to a first capacitor electrode of a storage capacitor Cst (and a gate electrode of a driving transistor). In a light emitting sub-phase of the image display phase, the driving transistor Td is turned on by the voltage level at the first capacitor electrode of the storage capacitor, and the driving transistor Td generates a driving current for driving the light emitting element LE to emit light. As shown in FIG. 1, the increase in RC delay and/or the decrease in charging time result in insufficient charging rate of the storage capacitor Cst of the pixel driving circuit. A storage capacitor of a pixel driving circuit further away from a data integrated circuit is less charged as compared to a storage capacitor of a pixel driving circuit closer to the data integrated circuit, due to the increase in RC delay and/or the decrease in charging time along the extension of the data line. These issues lead to display non-uniformity in the display panel.

Various appropriate pixel driving circuits may be used in the present disclosure. Examples of appropriate driving circuits include 3T1C, 2T1C, 4T1C, 4T2C, 5T2C, 6T1C, 7T1C, 7T2C, 8T1C, and 8T2C. Various appropriate light emitting elements may be used in the present disclosure. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 2:
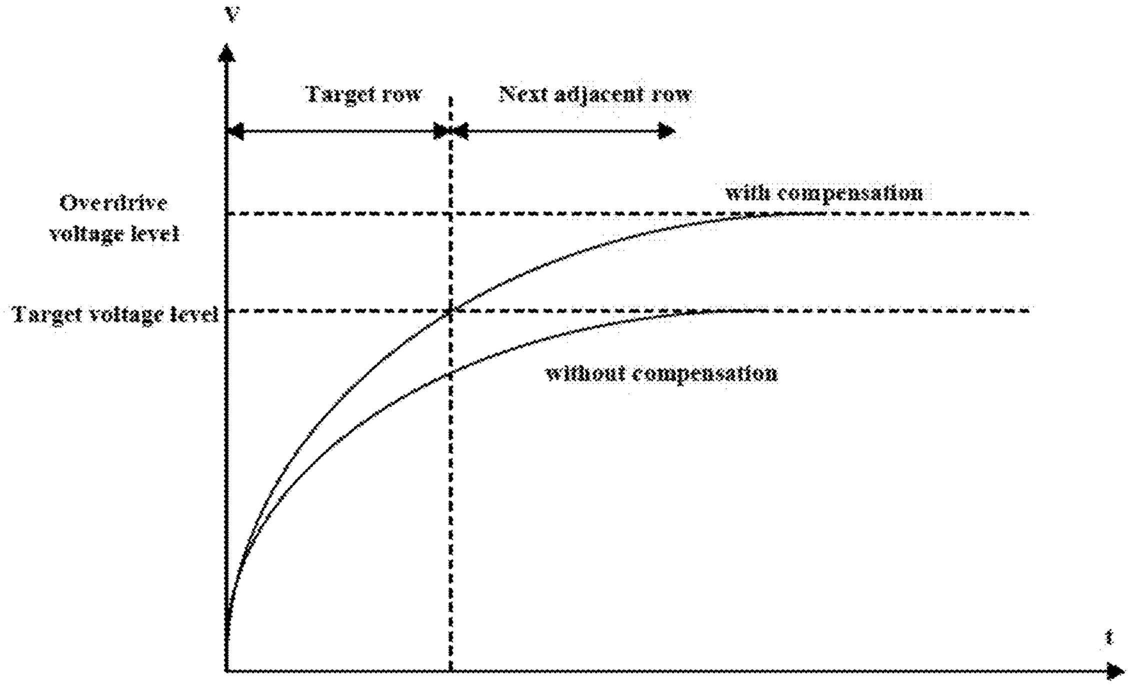
FIG. 2 illustrates a principle of compensating a charging rate of a pixel driving circuit in some embodiments according to the present disclosure.

The inventors of the present disclosure discover that, surprisingly and unexpectedly, the display non-uniformity issue can be obviated by compensating a respective initial grayscale value for a respective subpixel by at least a respective delay-compensating factor to obtain a respective converted grayscale value. FIG. 2 illustrates a principle of compensating a charging rate of a pixel driving circuit in some embodiments according to the present disclosure. Referring to FIG. 2, when a data signal without compensation and having a target voltage level is provided, due to RC delay and the decreased charging time, a subpixel in a target row is insufficiently charged (e.g., charged to a level lower than the target voltage level) when the data signal is transmitted to the target row. When a data signal with compensation and having an overdrive voltage level is provided, the subpixel in a target row can be charged to the target voltage level when the data signal is transmitted to the target row.

Figure 3:
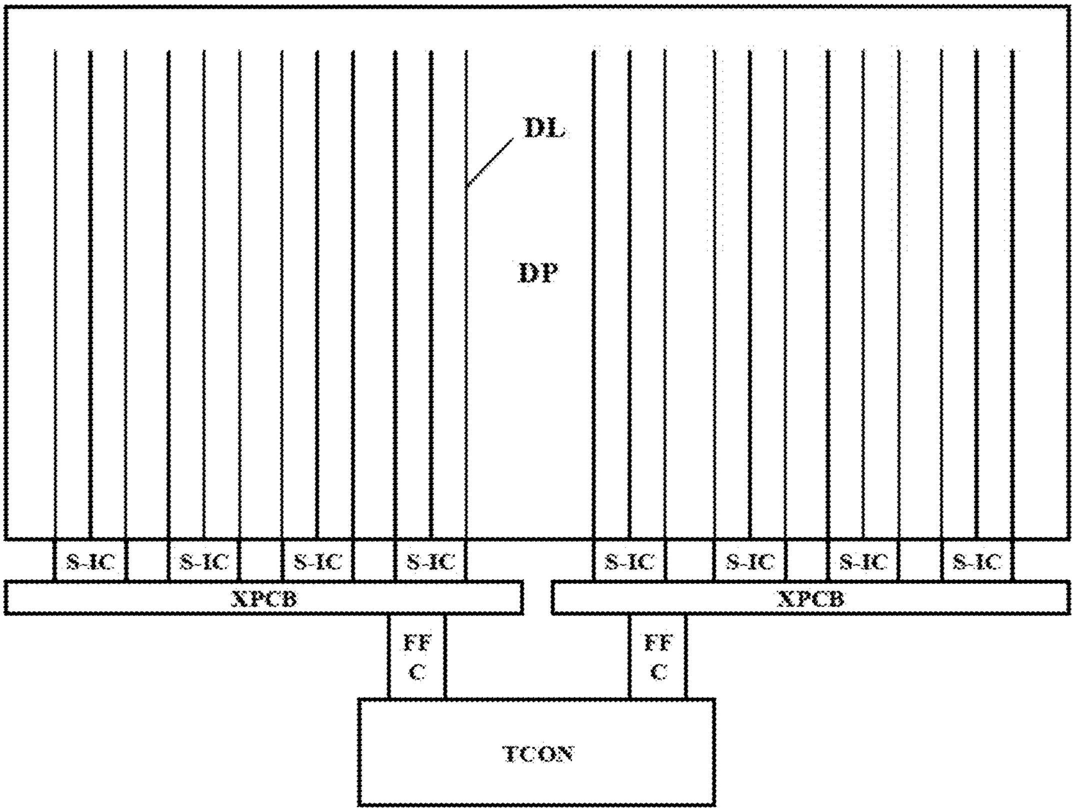
FIG. 3 is a schematic diagram illustrating the structure of a display apparatus implementing a method of driving a display panel in some embodiments according to the present disclosure.

FIG. 3 is a schematic diagram illustrating the structure of a display apparatus implementing a method of driving a display panel in some embodiments according to the present disclosure. Referring to FIG. 3, a timing controller TCON is configured to output digital data signals, the digital data signals are transmitted to a data integrated circuit S-IC through a flexible flat cable FFC and a printed circuit board XPCB. The data integrated circuit S-IC is configured to convert the digital data signals into analog data signals, the analog data signals are transmitted to subpixels through a data line DL.

In some embodiments, the method includes receiving, by the timing controller TCON, image data of a frame of image, the image data comprising a plurality of initial grayscale values respectively for a plurality of subpixels in the display panel; and converting, by the timing controller TCON, the image data into a converted image data comprising a plurality of converted grayscale values respectively for the plurality of subpixels. In some embodiments, converting the image data includes compensating a respective initial grayscale value for a respective subpixel by at least a respective delay-compensating factor to obtain a respective converted grayscale value.

In one example, compensating the respective initial grayscale value includes multiplying the respective initial grayscale value by a gain value to obtain the respective converted grayscale value. The data signal with the respective converted grayscale value is transmitted to the data integrated circuit, which generates a converted analog data signal with an overdrive voltage level.

Figure 4:
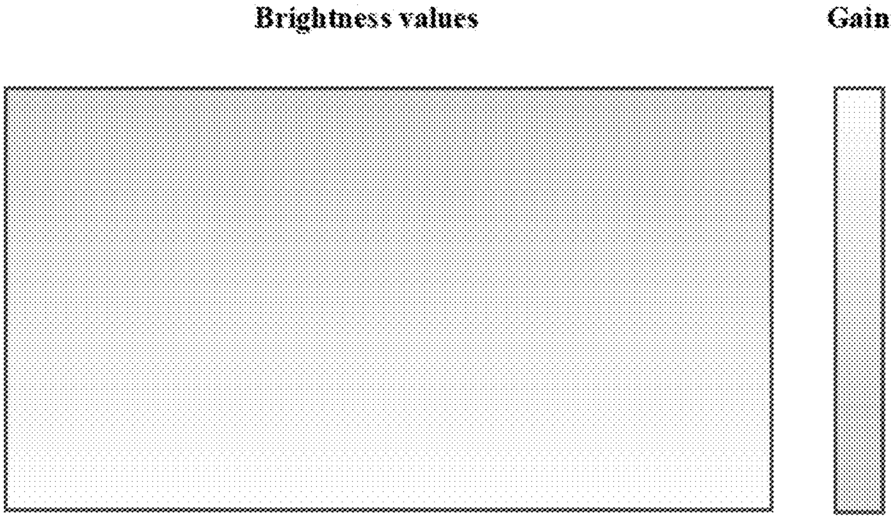
FIG. 4 illustrates brightness values and gain values in a display panel displaying a monochromatic image of a uniform grayscale for all subpixels.

FIG. 4 illustrates brightness values and gain values in a display panel displaying a monochromatic image of a uniform grayscale for all subpixels. Referring to FIG. 4, the data signals provided to the display panel are uncompensated data signals. As a data line extends from the data integrated circuit to another end of the display panel, the RC delay increases and the charging rate of the pixel driving circuit decreases. Due to the increased RC delay and the decreased charging rate, brightness values of subpixels closer to the data integrated circuit is greater than brightness values of subpixels away from the data integrated circuit, as shown in FIG. 4 (darker denotes smaller values). Accordingly, gain values required to compensate the data signals for subpixels away from the data integrated circuit are greater than gain values required to compensate the data signals for subpixels closer to the data integrated circuit, as shown in FIG. 4 (darker denotes smaller values). In one example, gain values for compensating the data signals for subpixels correlate with relative distances of the subpixels from the data integrated circuit. The greater the distance a subpixel is from the data integrated circuit, the greater the corresponding gain value. In another example, gain values gradually increase as the distance of the subpixels from the data integrated circuit increases.

In some embodiments, along an extension direction of the respective data line, the respective data line is first connected to a data integrated circuit, then to a q-th subpixel, and lastly to a p-th subpixel. With respect to the p-th subpixel and the q-th subpixel respectively connected to a respective data line and having a same initial grayscale values, a p-th delay-compensating factor for the p-th subpixel is greater than a q-th delay-compensating factor for the q-th subpixel such that a p-th converted grayscale value for the p-th subpixel is greater than a q-th converted grayscale value for the q-th subpixel.

In some embodiments, the respective data line is sequentially connected to the data integrated circuit, and then N number of subpixels respectively in N number of rows. Optionally, the p-th subpixel is in a p-th row, $1<p\leq N$; the q-th subpixel is in a q-th row, $1\leq q<N$; and the q-th row is between the data integrated circuit and the p-th row.

Figure 5:
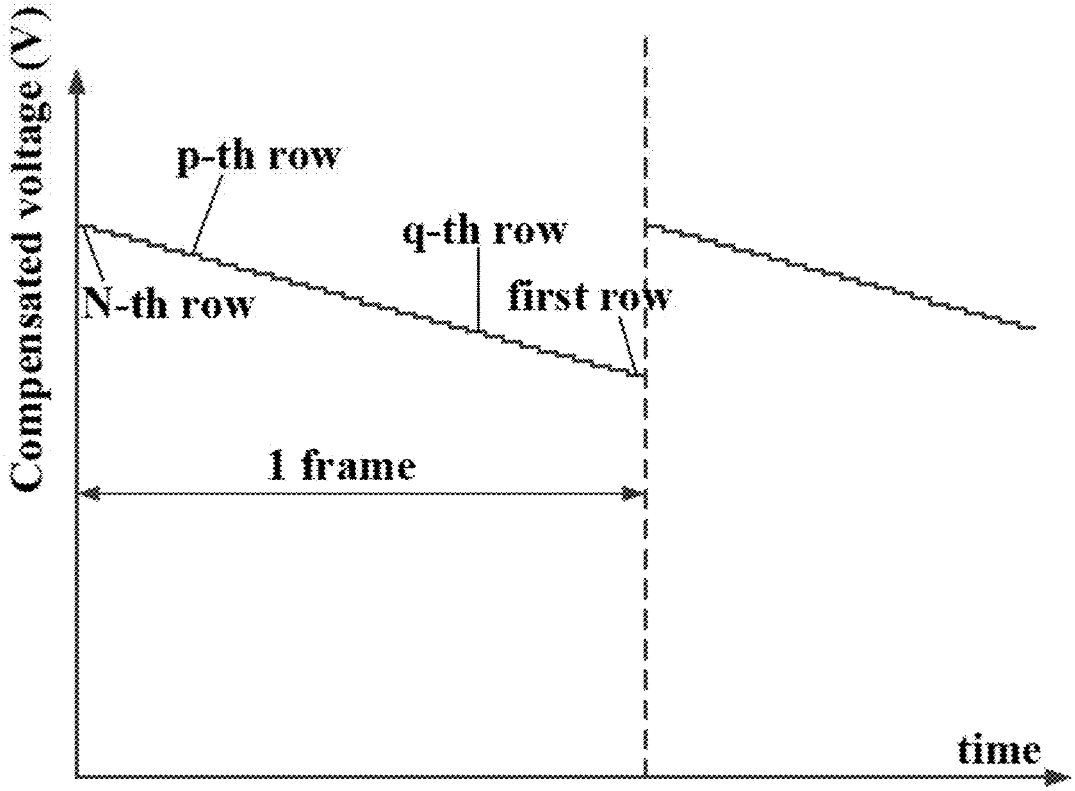
FIG. 5 illustrates compensated voltages respectively of compensated data signals for N subpixels respectively in N number of rows in some embodiments according to the present disclosure.

FIG. 5 illustrates compensated voltages respectively of compensated data signals for N subpixels respectively in N number of rows in some embodiments according to the present disclosure. Referring to FIG. 5, the first row is a row closest to the data integrated circuit, and the N-th row is a row most distal to the data integrated circuit. The q-th row is between the data integrated circuit and the p-th row, for example, the q-th row is between the first row and the p-th row. The compensated voltage for a subpixel in the N-th row is greater than the compensated voltage for a subpixel in the p-th row, which is greater than the compensated voltage for a subpixel in the q-th row.

Figure 6:
FIG. 6 illustrates brightness values in a display panel displaying a monochromatic image with compensated voltages.

FIG. 6 illustrates brightness values in a display panel displaying a monochromatic image with compensated voltages. The initial grayscale values for all subpixels are the same, the initial grayscale values are compensated by respective delay-compensating factors (e.g., respective gain values). With the compensation, as shown in FIG. 6, a uniform brightness can be achieved in the displayed image.

In some embodiments, converting the image data includes determining the respective converted grayscale value by a look-up table stored in a memory. The look-up table includes a plurality of pre-stored converted grayscale values respectively corresponding to different initial grayscale values for the respective subpixel.

In some embodiments, converting the image data includes calculating the respective converted grayscale value by a conversion algorithm.

In some embodiments, the conversion algorithm is expressed as Grc=Gri*Gain (R); wherein Grc stands for the respective converted grayscale value, Gri stands for the respective initial grayscale value, and Gain (R) stands for a factor correlated to a sequence number of a respective row in which the respective subpixel is located.

In some embodiments, the conversion algorithm is expressed as Grc=(a*Gri)+b; wherein Grc stands for the respective converted grayscale value. Gri stands for the respective initial grayscale value, a and b stand for parameters specific to the respective subpixel. In one example, the respective delay-compensating factor may be expressed as (a+(b/Gri)).

Figure 7:
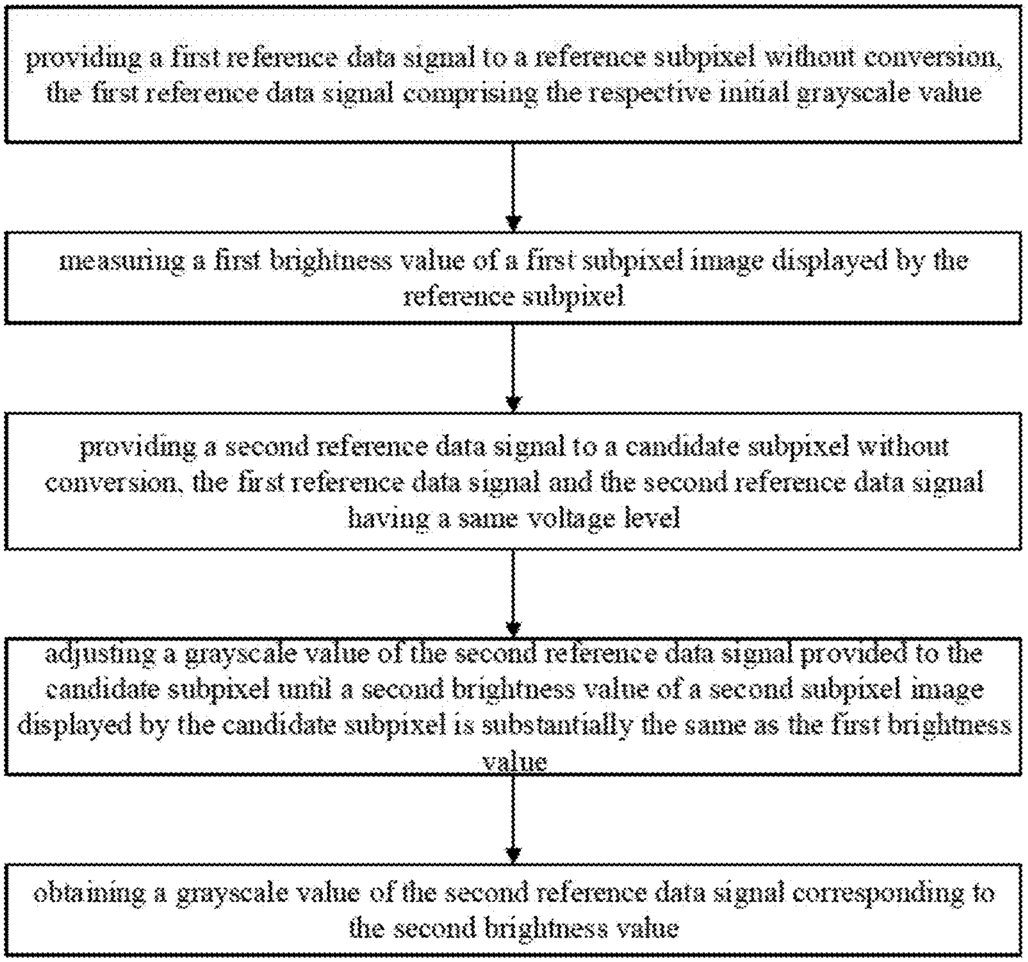
FIG. 7 illustrates a method of establishing a conversion algorithm in some embodiments according to the present disclosure.

In some embodiments, the method further includes establishing a conversion algorithm for converting the image data. FIG. 7 illustrates a method of establishing a conversion algorithm in some embodiments according to the present disclosure. Referring to FIG. 7, in some embodiments, establishing the conversion algorithm includes providing a first reference data signal to a reference subpixel without conversion, the first reference data signal comprising the respective initial grayscale value; measuring a first brightness value of a first subpixel image displayed by the reference subpixel; providing a second reference data signal to the respective subpixel without conversion; adjusting a grayscale value of the second reference data signal provided to the respective subpixel until a second brightness value of a second subpixel image displayed by the respective subpixel that is substantially the same as the first brightness value; and obtaining a grayscale value of the second reference data signal corresponding to the second brightness value. As used herein, the term "substantially the same" refers to a difference between two values not exceeding 5% of a base value (e.g., one of the two values), e.g., not exceeding 4%, not exceeding 3%, not exceeding 2%, not exceeding 1%, not exceeding 0.5%, not exceeding 0.1%, not exceeding 0.05%, not exceeding 0.01%, of the base value.

Figure 8A:
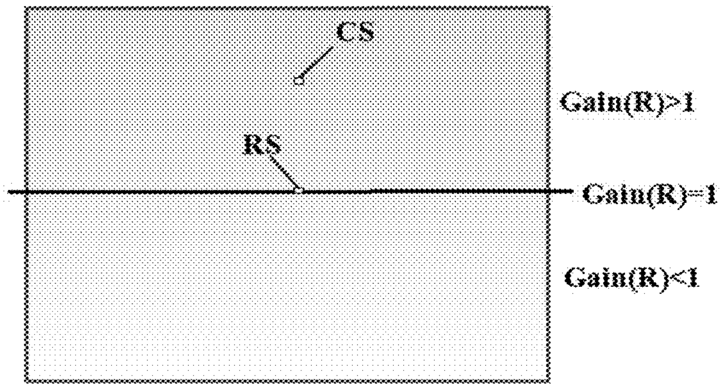
FIG. 8A illustrates an example of establishing a conversion algorithm in some embodiments according to the present disclosure.
Figure 8B:
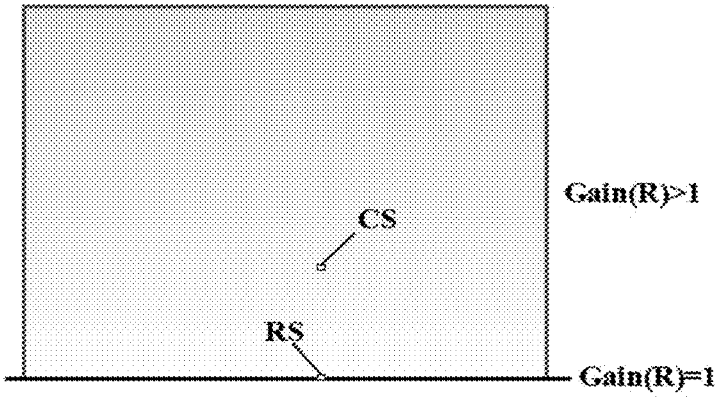
FIG. 8B illustrates an example of establishing a conversion algorithm in some embodiments according to the present disclosure.
Figure 8C:
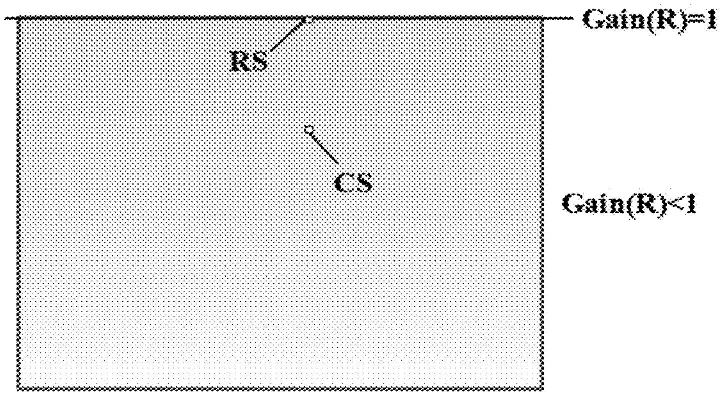
FIG. 8C illustrates an example of establishing a conversion algorithm in some embodiments according to the present disclosure.

FIG. 8A illustrates an example of establishing a conversion algorithm in some embodiments according to the present disclosure. FIG. 8B illustrates an example of establishing a conversion algorithm in some embodiments according to the present disclosure. FIG. 8C illustrates an example of establishing a conversion algorithm in some embodiments according to the present disclosure. Referring to FIG. 8A to FIG. 8C, the display panel is configured to display a first fame of a monochromatic image of a uniform grayscale for all subpixels. The data signals provided to the display panel are uncompensated data signals. As a data line extends from the data integrated circuit to another end of the display panel, the RC delay increases and the charging rate of the pixel driving circuit decreases. Due to the increased RC delay and the decreased charging rate, brightness values of subpixels closer to the data integrated circuit is greater than brightness values of subpixels away from the data integrated circuit, as shown in FIG. 8A to FIG. 8C (darker denotes smaller values).

In some embodiments, referring to FIG. 8A, a subpixel in a middle row of the display panel may be selected as a reference subpixel RS. A candidate subpixel for which the conversion algorithm is to be established is denoted as CS in FIG. 8A.

In some embodiments, referring to FIG. 8B, a subpixel in a bottom row of the display panel may be selected as a reference subpixel RS. A candidate subpixel for which the conversion algorithm is to be established is denoted as CS in FIG. 8B.

In some embodiments, referring to FIG. 8C, a subpixel in a top row of the display panel may be selected as a reference subpixel RS. A candidate subpixel for which the conversion algorithm is to be established is denoted as CS in FIG. 8C.

Optionally, the reference subpixel RS and the candidate subpixel CS are two subpixels connected to a same data line.

Optionally, the reference subpixel RS and the candidate subpixel CS are two subpixels respectively connected to two different data lines.

In displaying the first frame of a monochromatic image, a first reference data signal is provided to the reference subpixel RS without conversion, the first reference data signal comprising the respective initial grayscale value; a second reference data signal is provided to the candidate subpixel CS without conversion. Because the frame of image being displayed is a monochromatic image of a uniform grayscale for all subpixels, the first reference data signal and the second reference data signal have a same voltage level and a same initial grayscale value. Brightness values of subpixel images respectively displayed by subpixels in the display panel may be measured. For example, a first brightness value of a first subpixel image displayed by the reference subpixel RS is measured; and a brightness value of a subpixel image displayed by the candidate subpixel CS may be measured (but not required). Due to variations of the RC delay and charging rate in the display panel, the brightness value of the subpixel image displayed by the candidate subpixel CS is different from the first brightness value of the first subpixel image displayed by the reference subpixel RS. Referring to FIG. 8A, in one example, the brightness value of the subpixel image displayed by the candidate subpixel CS is less than the first brightness value of the first subpixel image displayed by the reference subpixel RS. Referring to FIG. 8B, in another example, the brightness value of the subpixel image displayed by the candidate subpixel CS is less than the first brightness value of the first subpixel image displayed by the reference subpixel RS. Referring to FIG. 8C, in another example, the brightness value of the subpixel image displayed by the candidate subpixel CS is greater than the first brightness value of the first subpixel image displayed by the reference subpixel RS.

The grayscale values of the data signals provided to the display panel are then adjusted until a second frame of image meeting requirements of the present method is found. For example, the grayscale values of the data signals provided to the display panel may be adjusted until a second brightness value of a second subpixel image displayed by the candidate subpixel CS is substantially the same as the first brightness value, thereby obtaining the second frame of image. In one example, the display panel is configured to display a second frame of a monochromatic image of a uniform grayscale for all subpixels, and the data signals provided to the display panel are uncompensated data signals. In the second frame of monochromatic image, the second brightness value of the second subpixel image displayed by the candidate subpixel CS is substantially the same as the first brightness value of the first subpixel image displayed by the reference subpixel RS in the first frame of monochromatic image. A grayscale value of the second reference data signal corresponding to the second brightness value is obtained.

In some embodiments, a Gain (R) factor for the candidate subpixel CS can be obtained by dividing the grayscale value of the second reference data signal (corresponding to the second brightness value) by the respective initial grayscale value. The Gain (R) factor is the factor used in the conversion algorithm Grc=Gri*Gain (R) discussed above. Accordingly, in some embodiments, the method further includes calculating a Gain (R) factor for the candidate subpixel by dividing the grayscale value of the second reference data signal by the respective initial grayscale value.

The steps of establishing the conversion algorithm and calculating the Gain (R) factor can be reiterated for each subpixel (e.g., a plurality of candidate subpixels) in the display panel (except for the reference subpixel RS). A respective conversion algorithm and a respective Gain (R) factor may be established for each subpixel in the display panel (except for the reference subpixel RS).

Moreover, the steps of establishing the conversion algorithm and calculating the Gain (R) factor can be reiterated for a plurality of initial grayscale values (e.g., from 0 to 255, at a selected interval, for example, 1). With respect to each initial grayscale value, a respective grayscale value of the second reference data signal (corresponding to the second brightness value) and a respective initial grayscale value are measured (e.g., respectively from a respective first frame of image and a respective second frame of image); and a respective Gain (R) factor is calculated. The conversion algorithm may be stored in a memory (e.g., in a memory of the timing controller), and the timing controller is configured to calculate converted grayscale values by the conversion algorithm.

Referring to FIG. 8A, a subpixel in a middle row of the display panel is selected as a reference subpixel RS. The Gain (R) factor for the subpixels in the middle row is 1. The Gain (R) factor for the subpixels in any row on a side of the middle row away from the data integrated circuit is greater than 1. The Gain (R) factor for the subpixels in any row on a side of the middle row closer to the data integrated circuit is less than 1.

Referring to FIG. 8B, a subpixel in a bottom row of the display panel is selected as a reference subpixel RS. The Gain (R) factor for the subpixels in the bottom row is 1. The Gain (R) factor for the subpixels in any row on a side of the bottom row away from the data integrated circuit is greater than 1.

Referring to FIG. 8C, a subpixel in a top row of the display panel is selected as a reference subpixel RS. The Gain (R) factor for the subpixels in the top row is 1. The Gain (R) factor for the subpixels in any row on a side of the top row closer to the data integrated circuit is less than 1.

Alternatively, a look-up table may be constructed using data points generated, e.g., by reiteration of the steps above for the plurality of candidate subpixels, a respective data point comprising correspondence between the grayscale value of the second reference data signal (e.g., a pre-stored converted grayscale value) and the corresponding respective initial grayscale value. Accordingly, the data points in the look-up table include pre-stored converted grayscale values and corresponding initial grayscale values for a plurality of subpixels in the display panel. Moreover, the look-up table include data points generated by reiteration of the steps for a plurality of initial grayscale values (e.g., from 0 to 255, at a selected interval, for example, 1). With respect to each initial grayscale value, a respective grayscale value of the second reference data signal (corresponding to the second brightness value) and a respective initial grayscale value are measured (e.g., respectively from a respective first frame of image and a respective second frame of image). The look-up table may be stored in a memory (e.g., in a memory of the timing controller), and the timing controller is configured to calculate converted grayscale values using the look-up table.

Accordingly, in some embodiments, the method further includes constructing a look-up table for converting the image data. In some embodiments, constructing the look-up table includes providing a first reference data signal to a reference subpixel without conversion, the first reference data signal comprising the respective initial grayscale value; measuring a first brightness value of a first subpixel image displayed by the reference subpixel; providing a second reference data signal to a candidate subpixel without conversion, the first reference data signal and the second reference data signal having a same voltage level; adjusting a grayscale value of the second reference data signal provided to the candidate subpixel until a second brightness value of a second subpixel image displayed by the candidate subpixel is substantially the same as the first brightness value; and obtaining a grayscale value of the second reference data signal corresponding to the second brightness value.

Figure 9:
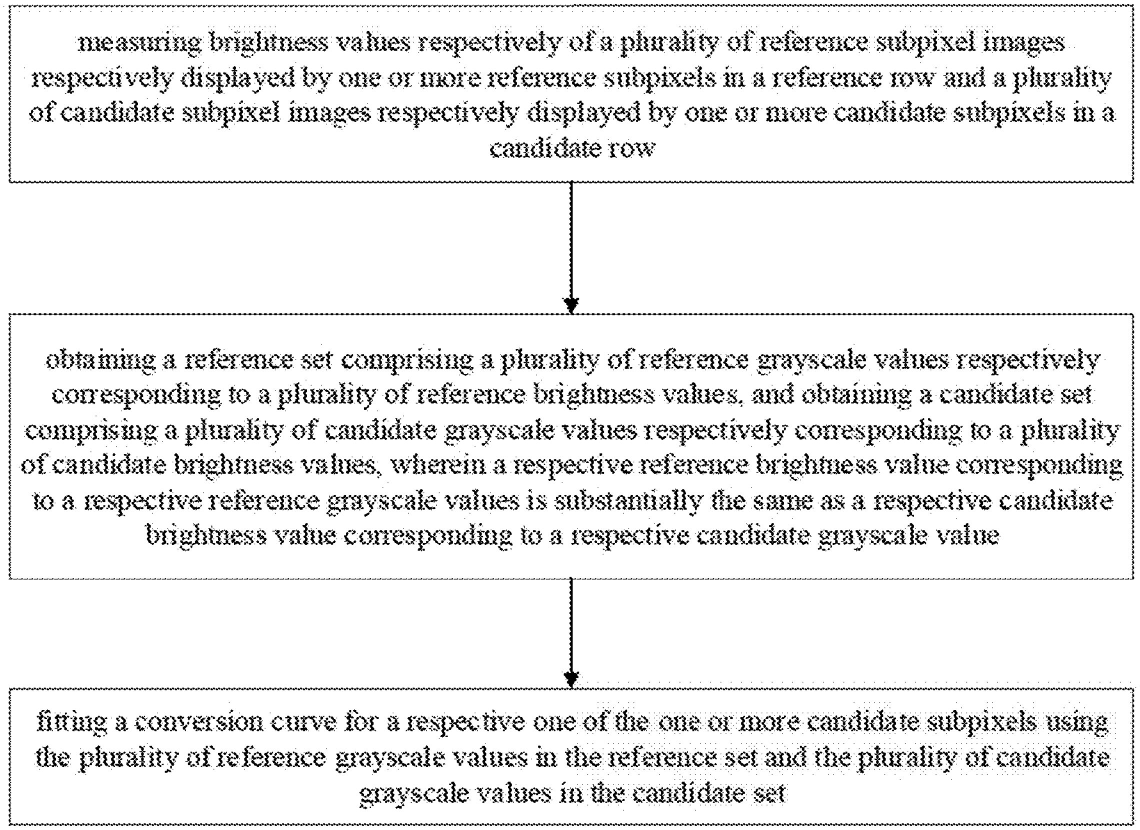
FIG. 9 illustrates a method of establishing a conversion algorithm in some embodiments according to the present disclosure.

FIG. 9 illustrates a method of establishing a conversion algorithm in some embodiments according to the present disclosure. Referring to FIG. 9, in some embodiments, establishing the conversion algorithm includes measuring brightness values respectively of a plurality of reference subpixel images respectively displayed by one or more reference subpixels in a reference row and a plurality of candidate subpixel images respectively displayed by one or more candidate subpixels in a candidate row; obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value; and fitting a conversion curve for a respective one of the one or more candidate subpixels using the plurality of reference grayscale values in the reference set and the plurality of candidate grayscale values in the candidate set.

Figure 10:
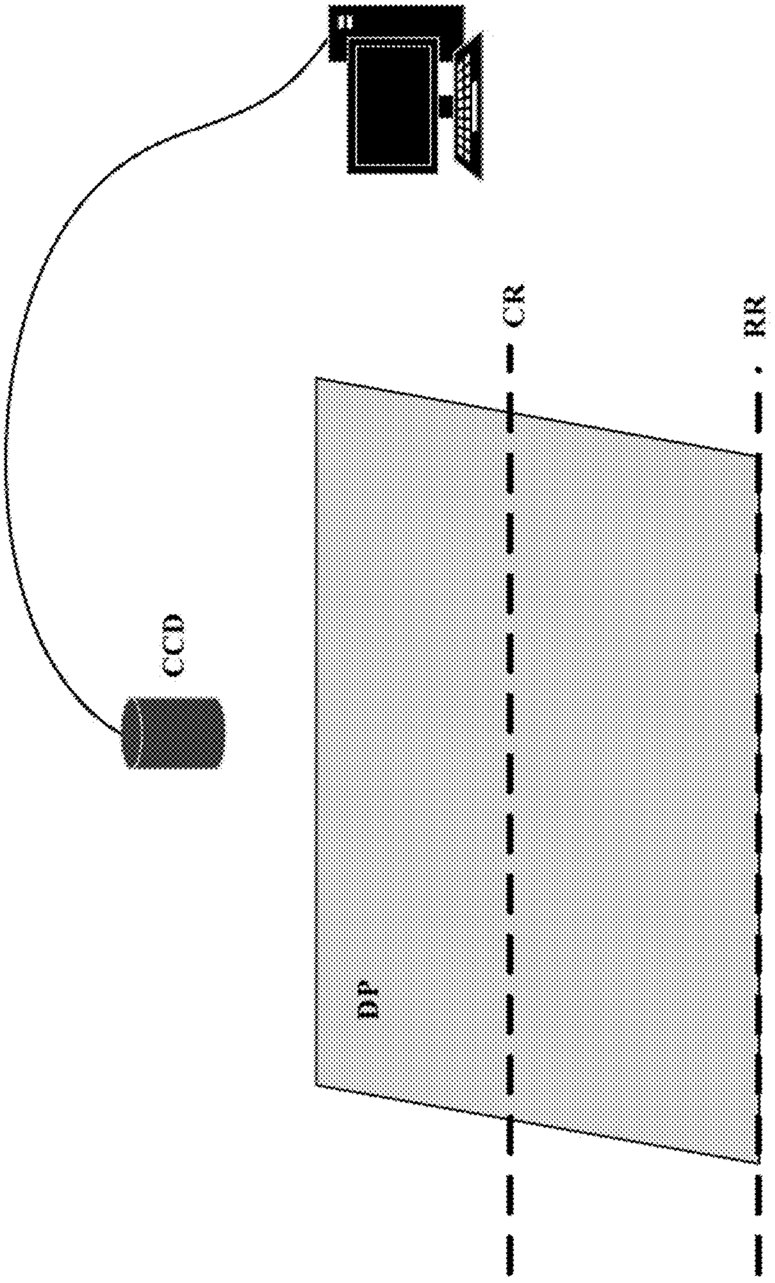
FIG. 10 illustrates an example of establishing a conversion algorithm in some embodiments according to the present disclosure.

FIG. 10 illustrates an example of establishing a conversion algorithm in some embodiments according to the present disclosure. Referring to FIG. 10, an image capturing device (e.g., a charge-coupled device camera CCD) is used to obtain one or more frames of images displayed by a display panel DP. The one or more frames of images can be analyzed to establish the conversion algorithm. In some embodiments, brightness values respectively of a plurality of reference subpixel images respectively displayed by one or more reference subpixels in a reference row RR are measured, e.g., by the charge-coupled device camera CCD; and brightness values respectively of a plurality of candidate subpixel images respectively displayed by one or more candidate subpixels in a candidate row CR are measured, e.g., by the charge-coupled device camera CCD.

In some embodiments, the plurality of reference subpixel images and the plurality of candidate subpixel images are subpixel images from a single frame of image. For example, when displaying the single frame of image, data signals of different initial grayscale values are respectively provided to different data lines. A first respective reference subpixel image displayed by a first respective reference subpixel in the reference row RR is used as the reference subpixel image for data signal of a first respective initial grayscale value. A second respective reference subpixel image displayed by a second respective reference subpixel in the reference row RR is used as the reference subpixel image for data signal of a second respective initial grayscale value. A third respective reference subpixel image displayed by a third respective reference subpixel in the reference row RR is used as the reference subpixel image for data signal of a third respective initial grayscale value.

In some embodiments, the plurality of reference subpixel images are respectively displayed by a plurality of reference subpixels in the reference row and respectively in a plurality of columns. In some embodiments, the plurality of candidate subpixel images are respectively displayed by a plurality of candidate subpixels in the candidate row and respectively in a plurality of columns. Optionally, the plurality of reference subpixel images are respectively displayed by a plurality of reference subpixels in the reference row and respectively in a plurality of columns; and the plurality of candidate subpixel images are respectively displayed by a plurality of candidate subpixels in the candidate row and respectively in a plurality of columns.

In some embodiments, the plurality of reference subpixel images and the plurality of candidate subpixel images are subpixel images from a plurality of frames of images. In one example, a respective frame of image is a frame of a monochromatic image of a uniform initial grayscale for all subpixels; and the plurality of frames of images correspond to different initial grayscales. In another example, a respective frame of image is a frame of image comprising subpixels images corresponding to at least two different initial grayscales.

In some embodiments, data points are extracted from the plurality of reference subpixel images and the plurality of candidate subpixel images where corresponding brightness values are found in certain reference subpixel images and certain candidate subpixel images. The data points are then used to establish the conversion algorithm. Specifically, a reference set comprising a plurality of reference grayscale values respectively corresponding to a plurality of reference brightness values is obtained; a candidate set comprising a plurality of candidate grayscale values respectively corresponding to a plurality of candidate brightness values is obtained; the reference set and the candidate set are obtained so that a respective reference brightness value corresponding to a respective reference grayscale values is substantially the same as a respective candidate brightness value corresponding to a respective candidate grayscale value. For example, the reference set includes a first reference grayscale value, a second reference grayscale value, and a third reference grayscale value respectively corresponding to a first brightness value, a second brightness value, and a third brightness value; the candidate set includes comprising a first candidate grayscale value, a second candidate grayscale value, and a third candidate grayscale value respectively corresponding to the first brightness value, the second brightness value, and the third brightness value; and the first reference grayscale value, the second reference grayscale value, the third reference grayscale, the first candidate grayscale value, the second candidate grayscale value, and the third candidate grayscale value are used for establishing the conversion algorithm. Accordingly, in some embodiments, the step of establishing the conversion algorithm further includes obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value.

Figure 11:
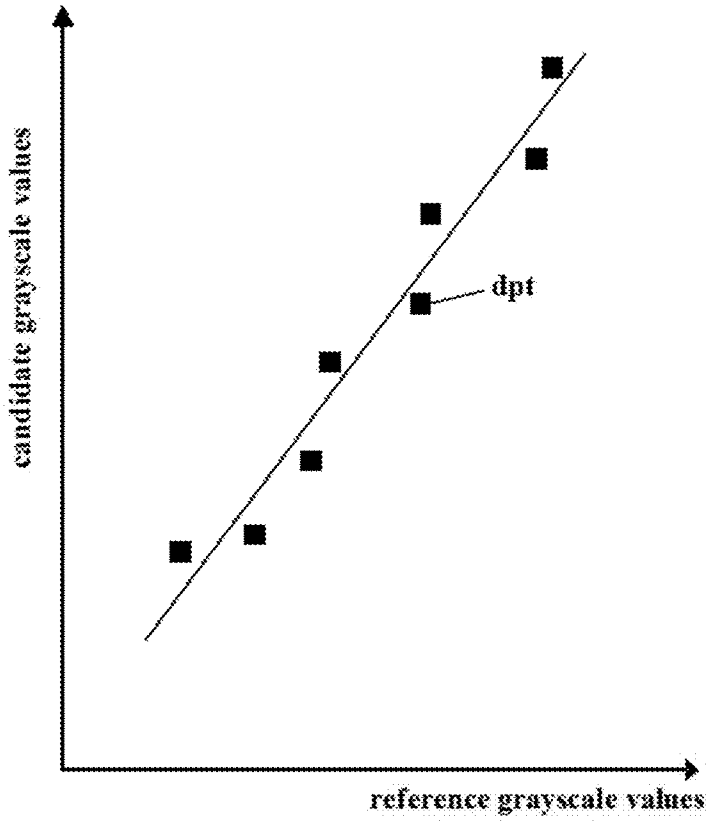
FIG. 11 illustrates an example of conversion curve fitted using a plurality of reference grayscale values in a reference set and a plurality of candidate grayscale values in a candidate set in some embodiments according to the present disclosure.

FIG. 11 illustrates an example of conversion curve fitted using a plurality of reference grayscale values in a reference set and a plurality of candidate grayscale values in a candidate set in some embodiments according to the present disclosure. Referring to FIG. 11, a respective data point dpt in FIG. 11 is plotted using a respective reference grayscale value and a respective candidate grayscale value having a substantially the same brightness value.

In some embodiments, for a respective one of the one or more candidate subpixels, a conversion curve can be fitted using the plurality of reference grayscale values in the reference set and the plurality of candidate grayscale values in the candidate set. For example, a conversion curve can be fitted using the first reference grayscale value, the second reference grayscale value, the third reference grayscale, the first candidate grayscale value, the second candidate grayscale value, and the third candidate grayscale value discussed in the example above. The conversion algorithm can be derived from the curve. Accordingly, in some embodiments, the step of establishing the conversion algorithm further includes fitting a conversion curve for a respective one of the one or more candidate subpixels using the plurality of reference grayscale values in the reference set and the plurality of candidate grayscale values in the candidate set. An example of the conversion algorithm may be expressed as $Grc=(a*Gri)+b$, as discussed above.

The steps of establishing the conversion algorithm (e.g., fitting the conversion curve) can be reiterated for a plurality of subpixels in the display panel. A respective conversion algorithm may be established specifically for each subpixel in the display panel.

Alternatively, a look-up table may be constructed using data point sets generated, e.g., by reiteration of the steps above for the plurality of subpixels, a respective data point set comprising a respective reference set and a respective candidate set, the respective reference set comprising a plurality of reference grayscale values for a respective subpixel, the respective candidate set comprising a plurality of candidate grayscale values for the respective subpixel. With respect to the respective subpixel, the look-up table includes a plurality of pre-stored converted grayscale values and a plurality of initial grayscale values, the plurality of pre-stored converted grayscale values comprising the plurality of candidate grayscale values for the respective subpixel, and the plurality of initial grayscale values comprising the plurality of reference grayscale values for a respective subpixel. The look-up table may be stored in a memory (e.g., in a memory of the timing controller), and the timing controller is configured to calculate converted grayscale values using the look-up table.

Accordingly, in some embodiments, the method further includes constructing a look-up table for converting the image data. In some embodiments, constructing the look-up table includes measuring brightness values respectively of a plurality of reference subpixel images respectively displayed by one or more reference subpixels in a reference row and a plurality of candidate subpixel images respectively displayed by one or more candidate subpixels in a candidate row; and obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value.

In some embodiments, converting the image data includes compensating the respective initial grayscale value for the respective subpixel by at least the respective delay-compensating factor and a respective secondary compensating factor to obtain the respective converted grayscale value. In some embodiments, the respective secondary compensating factor is correlated to a difference between the respective initial grayscale value and an initial grayscale value of an immediately adjacent subpixel, the immediately adjacent subpixel and the respective subpixel being connected to a same data line, and data signals are respectively provided first to the immediately adjacent subpixel and then to the respective subpixel sequentially and consecutively. Prior to writing the data signal in the present row, a residual voltage from the data signal in the previous row at least still partially remain in the data line. The presence of the residual voltage affects the charging rate of the data signal in the present row. To further improve data signal compensation, the respective secondary compensating factor may be used in compensating the respective initial grayscale value for the respective subpixel.

In one example, the initial grayscale value of an immediately adjacent subpixel connected to the same data line is 200 (corresponding to a relatively high voltage level), and the respective initial grayscale value is 50 (corresponding to a relatively low voltage level). The presence of the residual voltage from charging the immediately adjacent subpixel affects the charging rate of the data signal in the present row. In order to lower the voltage signal during one frame of image (e.g., from a high voltage level corresponding to a grayscale of 200 to a low voltage level corresponding to a grayscale of 50), the respective initial grayscale value may be compensated by the respective secondary compensating factor. In one example, the respective secondary compensating factor may be a factor of 4/5. At the same time, the respective initial grayscale value is additionally compensated by the respective delay-compensating factor (e.g., the Gain (R) factor), as discussed above. For example, the respective initial grayscale value may be compensated by 4/5*Gain(R).

In another example, the initial grayscale value of an immediately adjacent subpixel connected to the same data line is 50 (corresponding to a relatively low voltage level), and the respective initial grayscale value is 200 (corresponding to a relatively high voltage level). The presence of the residual voltage from charging the immediately adjacent subpixel affects the charging rate of the data signal in the present row. In order to increase the voltage signal during one frame of image (e.g., from a low voltage level corresponding to a grayscale of 50 to a high voltage level corresponding to a grayscale of 200), the respective initial grayscale value may be compensated by the respective secondary compensating factor. In one example, the respective secondary compensating factor may be a factor of 11/10. At the same time, the respective initial grayscale value is additionally compensated by the respective delay-compensating factor (e.g., the Gain(R) factor), as discussed above. For example, the respective initial grayscale value may be compensated by 11/10*Gain(R).

In another aspect, the present disclosure provides a timing controller configured to receive image data of a frame of image, the image data comprising a plurality of initial grayscale values respectively for a plurality of subpixels in the display panel; and convert the image data into a converted image data comprising a plurality of converted grayscale values respectively for the plurality of subpixels. In some embodiments, the timing controller is configured to compensate a respective initial grayscale value for a respective subpixel by at least a respective delay-compensating factor to obtain a respective converted grayscale value. Optionally, with respect to a p-th subpixel and a q-th subpixel respectively connected to a respective data line and having a same initial grayscale values, a p-th delay-compensating factor for the p-th subpixel is greater than a q-th delay-compensating factor for the q-th subpixel such that a p-th converted grayscale value for the p-th subpixel is greater than a q-th converted grayscale value for the q-th subpixel. Optionally, along an extension direction of the respective data line is first connected to a data integrated circuit, then to q-th subpixel, and lastly to the p-th subpixel.

In some embodiments, the respective data line is sequentially connected to the data integrated circuit, and then N number of subpixels respectively in N number of rows; the p-th subpixel is in a p-th row, $1<p\leq N$; the q-th subpixel is in a q-th row, $1\leq q<N$; and the q-th row is between the data integrated circuit and the p-th row.

In some embodiments, converting the image data comprises determining the respective converted grayscale value by a look-up table stored in a memory. Optionally, the look-up table comprises a plurality of pre-stored converted grayscale values respectively corresponding to different initial grayscale values for the respective subpixel.

In some embodiments, converting the image data comprises calculating the respective converted grayscale value by a conversion algorithm.

In some embodiments, the conversion algorithm is expressed as Grc=Gri*Gain (R); wherein Grc stands for the respective converted grayscale value, Gri stands for the respective initial grayscale value, and Gain (R) stands for a factor correlated to a sequence number of a respective row in which the respective subpixel is located.

In some embodiments, the conversion algorithm is expressed as Grc=(a*Gri)+b; wherein Grc stands for the respective converted grayscale value, Gri stands for the respective initial grayscale value, a and b stand for parameters specific to the respective subpixel.

In some embodiments, the timing controller is configured to compensate the respective initial grayscale value for the respective subpixel by at least the respective delay-compensating factor and a respective secondary compensating factor to obtain the respective converted grayscale value. Optionally, the respective secondary compensating factor is correlated to a difference between the respective initial grayscale value and an initial grayscale value of an immediately adjacent subpixel, the adjacent subpixel and the respective subpixel being connected to a same data line, and data signals are respectively provided first to the adjacent subpixel and then to the respective subpixel sequentially and consecutively.

In another aspect, the present disclosure provides a display apparatus. In some embodiments, the display apparatus includes a timing controller described herein, a display panel, and a plurality of data integrated circuits, a respective data integrated circuit is coupled to the timing controller and coupled to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

In some embodiments, establishing the conversion algorithm or constructing the look-up table includes providing a first reference data signal to a reference subpixel without conversion, the first reference data signal comprising the respective initial grayscale value; measuring a first brightness value of a first subpixel image displayed by the reference subpixel; providing a second reference data signal to a candidate subpixel without conversion, the first reference data signal and the second reference data signal having a same voltage level; adjusting a grayscale value of the second reference data signal provided to the candidate subpixel until a second brightness value of a second subpixel image displayed by the candidate subpixel is substantially the same as the first brightness value; and obtaining a grayscale value of the second reference data signal corresponding to the second brightness value.

In some embodiments, the look-up table includes correspondence between the grayscale value of the second reference data signal and the respective initial grayscale value.

In some embodiments, establishing the conversion algorithm further includes calculating a Gain (R) factor for the candidate subpixel by dividing the grayscale value of the second reference data signal by the respective initial grayscale value.

In some embodiments, establishing the conversion algorithm or constructing the look-up table includes measuring brightness values respectively of a plurality of reference subpixel images respectively displayed by one or more reference subpixels in a reference row and a plurality of candidate subpixel images respectively displayed by one or more candidate subpixels in a candidate row; and obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value.

In some embodiments, the look-up table includes correspondence respectively between the plurality of reference grayscale values in the reference set for a respective subpixel, and the plurality of candidate grayscale values in the candidate set for the respective subpixel In some embodiments, establishing the conversion algorithm further includes fitting a conversion curve for a respective one of the one or more candidate subpixels using the plurality of reference grayscale values in the reference set and the plurality of candidate grayscale values in the candidate set.

In another aspect, the present disclosure provides a method of calibrating a display apparatus. In some embodiments, the method includes establishing a conversion algorithm or constructing a look-up table; receiving image data of a frame of image, the image data comprising a plurality of initial grayscale values respectively for a plurality of subpixels in the display panel; and converting the image data into a converted image data comprising a plurality of converted grayscale values respectively for the plurality of subpixels, using the conversion algorithm or the look-up table.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for driving a display panel comprising:

receiving image data of a frame of image, the image data comprising a plurality of initial grayscale values respectively for a plurality of subpixels in the display panel;

converting the image data into a converted image data comprising a plurality of converted grayscale values respectively for the plurality of subpixels; and establishing a conversion algorithm for converting the image data or constructing a look-up table for converting the image data;

wherein converting the image data comprises compensating a respective initial grayscale value for a respective subpixel by at least a respective delay-compensating factor to obtain a respective converted grayscale value;

wherein, with respect to a p-th subpixel and a q-th subpixel respectively connected to a respective data line and having a same initial grayscale values, a p-th delay-compensating factor for the p-th subpixel is greater than a q-th delay-compensating factor for the q-th subpixel such that a p-th converted grayscale value for the p-th subpixel is greater than a q-th converted grayscale value for the q-th subpixel; and along an extension direction of the respective data line, the respective data line is first connected to a data integrated circuit, then to the q-th subpixel, and lastly to the p-th subpixel;

wherein establishing the conversion algorithm or constructing the look-up table comprises:

measuring brightness values respectively of a plurality of reference subpixel images respectively displayed by one or more reference subpixels in a reference row and a plurality of candidate subpixel images respectively displayed by one or more candidate subpixels in a candidate row; and obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value;

wherein establishing the conversion algorithm further comprises fitting a conversion curve for a respective one of the one or more candidate subpixels using the plurality of reference grayscale values in the reference set and the plurality of candidate grayscale values in the candidate set.

2. The method of claim 1, wherein the respective data line is sequentially connected to the data integrated circuit, and then N number of subpixels respectively in N number of rows;

the p-th subpixel is in a p-th row, $1<p\leq N$;

the q-th subpixel is in a q-th row, $1\leq q<N$; and the q-th row is between the data integrated circuit and the p-th row.

3. The method of claim 1, wherein converting the image data comprises determining the respective converted grayscale value by a look-up table stored in a memory; and wherein the look-up table comprises a plurality of pre-stored converted grayscale values respectively corresponding to different initial grayscale values for the respective subpixel.

4. The method of claim 1, wherein converting the image data comprises calculating the respective converted grayscale value by a conversion algorithm.

5. The method of claim 4, wherein the conversion algorithm is expressed as Grc=Gri*Gain (R);

wherein Grc stands for the respective converted grayscale value, Gri stands for the respective initial grayscale value, and Gain (R) stands for a factor correlated to a sequence number of a respective row in which the respective subpixel is located.

6. The method of claim 4, wherein the conversion algorithm is expressed as Grc=(a*Gri)+b;

wherein Grc stands for the respective converted grayscale value, Gri stands for the respective initial grayscale value, a and b stand for parameters specific to the respective subpixel.

7. The method of claim 1, wherein establishing the conversion algorithm or constructing the look-up table comprises:

providing a first reference data signal to a reference subpixel without conversion, the first reference data signal comprising the respective initial grayscale value;

measuring a first brightness value of a first subpixel image displayed by the reference subpixel;

providing a second reference data signal to a candidate subpixel without conversion, the first reference data signal and the second reference data signal having a same voltage level;

adjusting a grayscale value of the second reference data signal provided to the candidate subpixel until a second brightness value of a second subpixel image displayed by the candidate subpixel is substantially the same as the first brightness value; and obtaining a grayscale value of the second reference data signal corresponding to the second brightness value.

8. The method of claim 7, wherein establishing the conversion algorithm further comprises calculating a Gain (R) factor for the candidate subpixel by dividing the grayscale value of the second reference data signal by the respective initial grayscale value.

9. The method of claim 1, wherein the plurality of reference subpixel images and the plurality of candidate subpixel images are subpixel images from a same frame of image displayed by the display panel.

10. The method of claim 1, wherein the plurality of reference subpixel images are respectively displayed by a plurality of reference subpixels in the reference row and respectively in a plurality of columns; or the plurality of candidate subpixel images are respectively displayed by a plurality of candidate subpixels in the candidate row and respectively in a plurality of columns.

11. The method of claim 1, wherein the plurality of reference subpixel images and the plurality of candidate subpixel images are subpixel images from at least two frames of image displayed by the display panel.

12. The method of claim 1, wherein converting the image data comprises compensating the respective initial grayscale value for the respective subpixel by at least the respective delay-compensating factor and a respective secondary compensating factor to obtain the respective converted grayscale value; and the respective secondary compensating factor is correlated to a difference between the respective initial grayscale value and an initial grayscale value of an immediately adjacent subpixel, the immediately adjacent subpixel and the respective subpixel being connected to a same data line, and data signals are respectively provided first to the immediately adjacent subpixel and then to the respective subpixel sequentially and consecutively.

13. A method of calibrating a display apparatus, comprising:

establishing a conversion algorithm or constructing a look-up table;

receiving image data of a frame of image, the image data comprising a plurality of initial grayscale values respectively for a plurality of subpixels in a display panel; and converting the image data into a converted image data comprising a plurality of converted grayscale values respectively for the plurality of subpixels, using the conversion algorithm or the look-up table;

wherein establishing the conversion algorithm or constructing the look-up table comprises:

measuring brightness values respectively of a plurality of reference subpixel images respectively displayed by one or more reference subpixels in a reference row and a plurality of candidate subpixel images respectively displayed by one or more candidate subpixels in a candidate row; and obtaining a reference set comprising a plurality of reference grayscale values respectively corresponding to a plurality of reference brightness values, and obtaining a candidate set comprising a plurality of candidate grayscale values respectively corresponding to a plurality of candidate brightness values, wherein a respective reference brightness value corresponding to a respective reference grayscale values is substantially the same as a respective candidate brightness value corresponding to a respective candidate grayscale value;

wherein establishing the conversion algorithm further comprises fitting a conversion curve for a respective one of the one or more candidate subpixels using the plurality of reference grayscale values in the reference set and the plurality of candidate grayscale values in the candidate set.

14. The method of claim 13, wherein establishing the conversion algorithm or constructing the look-up table comprises:

providing a first reference data signal to a reference subpixel without conversion, the first reference data signal comprising a respective initial grayscale value;

measuring a first brightness value of a first subpixel image displayed by the reference subpixel;

providing a second reference data signal to a candidate subpixel without conversion, the first reference data signal and the second reference data signal having a same voltage level;

adjusting a grayscale value of the second reference data signal provided to the candidate subpixel until a second brightness value of a second subpixel image displayed by the candidate subpixel is substantially the same as the first brightness value; and obtaining a grayscale value of the second reference data signal corresponding to the second brightness value.

* * * * *